United States Patent [19]

Brauer

[11] Patent Number: 4,702,434
[45] Date of Patent: Oct. 27, 1987

[54] TAPE CASSETTE ARRANGEMENT

[76] Inventor: Roger Brauer, 30 Henry Ave., Palisades Park, N.J. 07650

[21] Appl. No.: 864,427

[22] Filed: May 19, 1986

[51] Int. Cl.$^4$ .................. G11B 15/32; G11B 23/04
[52] U.S. Cl. ................................ 242/198; 242/199
[58] Field of Search ................... 242/199, 198, 197

[56] References Cited

U.S. PATENT DOCUMENTS

| | | | |
|---|---|---|---|
| 3,771,745 | 11/1973 | Yamada | 242/204 |
| 3,995,319 | 11/1976 | Harris | 242/199 X |
| 4,274,605 | 6/1981 | Gruber, Jr. | 242/55 |
| 4,466,584 | 8/1984 | Chevalier | 242/199 |
| 4,482,104 | 11/1984 | Saito | 242/198 |
| 4,513,929 | 4/1985 | Aishi | 242/198 |
| 4,553,717 | 11/1985 | Takagi | 242/199 X |
| 4,575,778 | 3/1986 | Vogelsang | 242/199 X |
| 4,586,101 | 4/1986 | Vogelsang | 242/199 X |
| 4,604,671 | 8/1986 | Oishi | 242/198 X |
| 4,607,307 | 8/1986 | Sieben | 242/199 X |

Primary Examiner—Stuart S. Levy
Assistant Examiner—Katherine Matecki
Attorney, Agent, or Firm—Richard A. Joel

[57] ABSTRACT

A tape cassette arrangement comprises a supply reel and a take up reel and control means acting upon the take up reel to prevent unauthorized rewinding of the tape. The control means comprises a pawl which engages the take up reel in the tape unwinding direction and a slidable mechanism which releases the pawl from the toothed periphery of the reel. To permit authorized rewinding of the cassette, the ratchet may be disengaged by moving the controlling mechanism with a tool inserted into an aperture in the cassette housing. To prevent a knowledgable user from inserting a tool into the aperture and playing, rewinding and playing, the cassette over and over again, a second pawl is mounted to engage the supply reel stopping its rotations in the tape playing direction. The second pawl is engaged when a rewinding tool is inserted into an aperture in the cassette housing. A counter is connected to the control mechanism to record the number of times the tape is played.

5 Claims, 8 Drawing Figures

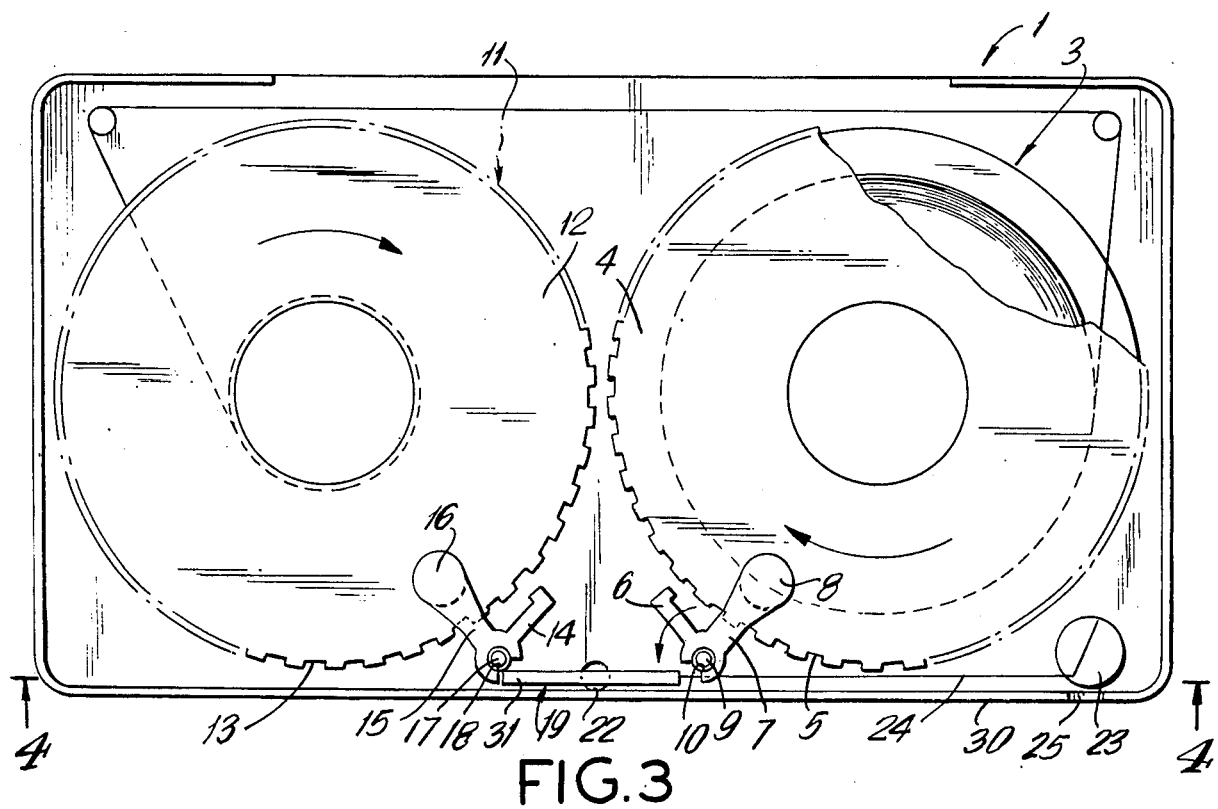

TAPE CASSETTE ARRANGEMENT

BACKGROUND OF THE INVENTION

The present invention relates to an apparatus for counting and limiting the number of times that a cassette can be played and particularly to an inexpensive, relatively simple means for capitalizing on the intellectual property contained on cassette tapes.

The prior art includes Saito U.S. Pat. No. 4,482,104 which discloses a tape cassette which prevents the user from rewinding magnetic tape and includes specific lock means for preventing tape rotation. The patent discloses a reel lock mechanism to prevent rewinding of the tape after it has been run from the supply reel to the take up reel.

U.S. Pat. No. 4,466,584 to Chevalier discloses an apparatus and method for counting and limiting the number of plays of a cassette. The patent is of interest from the standpoint of disclosing a counter. U.S. Pat. Nos. 3,771,745 to Yamada and 4,274,605 to Gruber disclose, respectively, a film feed mechanism for moving film in a normal and reverse direction using one way clutches associated with each brake wheel and a use registering reel for flexible tape. In the latter patent, the counter assembly includes actual indicating means for registering revolutions of the wheel preferably in a single predetermined direction.

While the prior art discloses the general concept of tape disabling and counting means, the specific, unique, simple and inexpensive means disclosed by applicant is nowhere anticipated by the prior art.

SUMMARY OF THE INVENTION

The present invention relates to a single play tape cassette and particularly to a cassette having means mounted within the cassette to limit the number of plays.

The cassette includes a pawl which engages a take up reel after the cassette has been played to prevent unauthorized rewinding. A control mechanism is mounted within the cassette to be engaged by a special tool inserted through an aperture in the cassette. The tool disengages the pawl from the periphery of the take up reel so that the tape may be rewound. A second pawl is provided to engage the supply reel to prevent replay if dissengagement of the take up reel by an unauthorized user was to occur. The cassette includes a control mechanism which is activated to simultaneously disengage the supply reel pawl and engage the take up reel pawl. A counter is activated each time the tool is used to permit rewinding of the cassette. Thus, it is possible to limit and charge for each authorized use of the cassette.

Accordingly an object of this invention is to provide a new and improved tape cassette which includes built-in use restrictions.

Another object of this invention is to provide a simple and inexpensive means to limit the playing of a tape cassette by the use of control means mounted therein.

A still further object of this invention is to provide a new and improved tape cassette which includes pawl means which engage the take up and supply reel to prevent the unauthorized use thereof; and, A more specific object to this invention is to provide a new and improved tape cassette which includes means for engaging the take up reel to prevent rewinding, means for engaging the supply reel to prevent playing, control means which deactivates the ratchet means to prevent reuse and counting means which are activated each time the control means is engaged, the control means being activated by an external tool which is inserted into the cassette housing.

BRIEF DESCRIPTION OF THE DRAWINGS

The above and other objects and advantages of the present invention may be more clearly seen when viewed in conjunction with the accompanying drawings wherein:

FIG. 3 is a top view of the invention in a playing mode with portions cut away;

FIG. 4 is a cross-sectional view taken along the line 4—4 of FIG. 3;

DETAIL DESCRIPTION OF THE INVENTION

Figure 1:
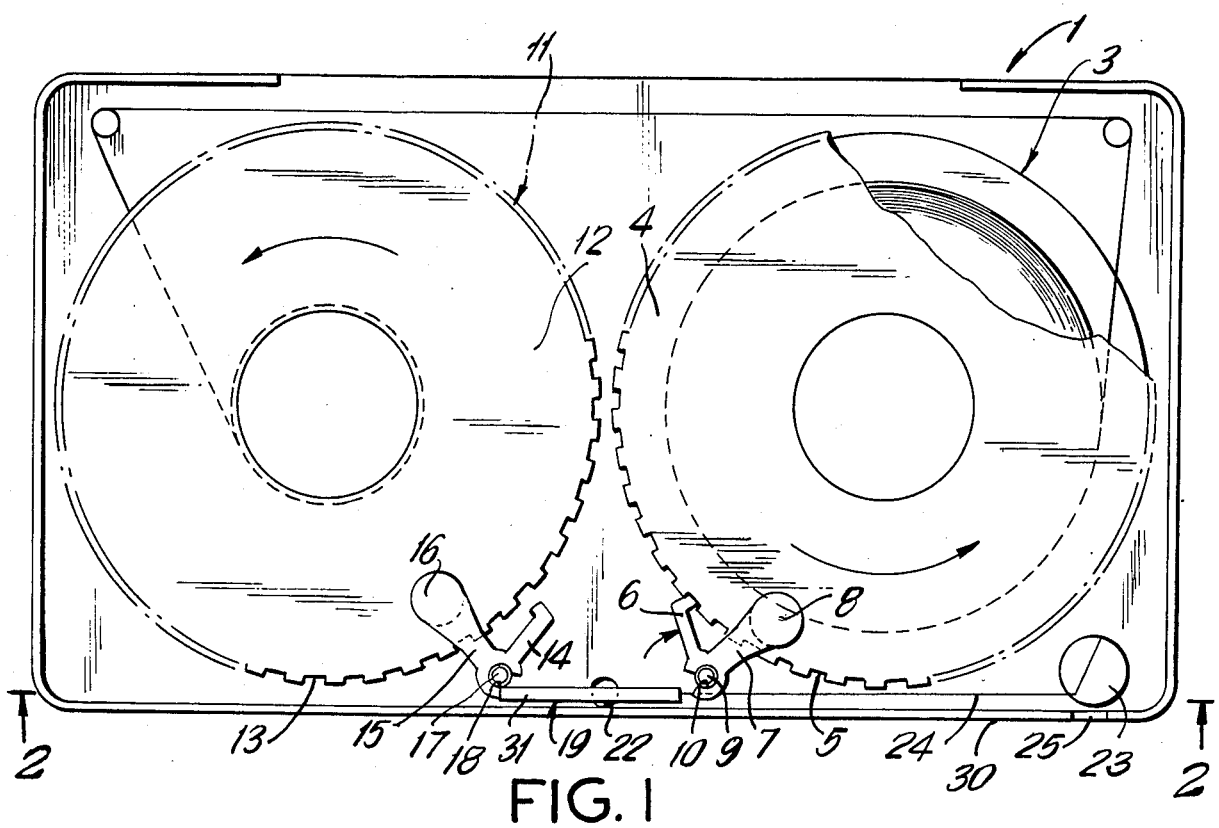
FIG. 1 is a top view of the invention in a mode to prevent unwinding with portions cut away.
Figure 2:
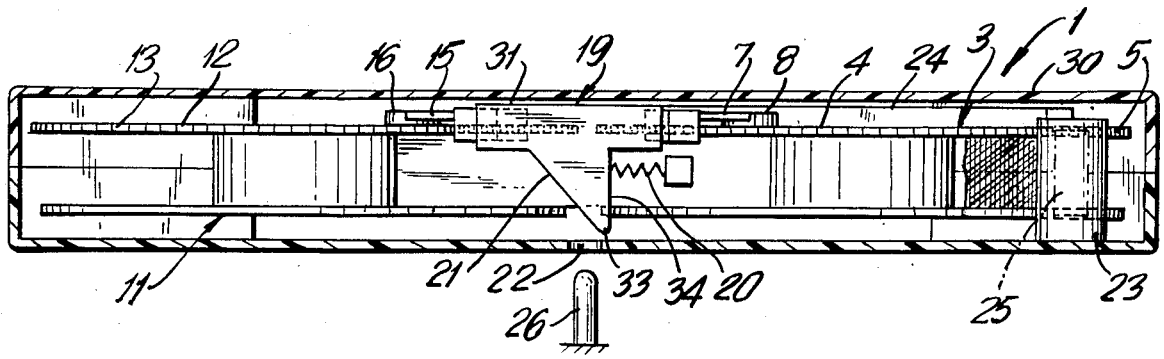
FIG. 2 is a cross-sectional view taken along the line 2—2 of FIG. 1.

Referring now to the drawings, the invention comprises a single play video cassette 1 as shown in FIG. 1 including means which prevents unauthorized rewinding of the single play video cassette. A pawl 6 is mounted inside the cassette housing 30 on a pivot pin 9 and includes an integral finger 7 extending at an angle which terminates in a frictional surface 8. The pawl is activated by the mechanically connected finger 7 with the frictional surface 8 held in frictional contact with the take up reel flange 4 by gravity or elasticity of the material. The combination pawl 6 and the activator finger 7 are located in the cassette housing 30 adjacent to the take up reel 3. When the take up reel 3 rotates in the tape unwinding direction (rewinding), the frictional contact between the frictional surface 8 of the activator finger 7 and the take up reel flange 4 transmits the movement of the take up reel to the finger 7. The finger 7 rotates about its pivot pin 9 driving the integral pawl 6 into the toothed periphery 5 of the take up reel flange 4, halting its rotation in the tape rewinding direction.

FIG. 3 shows the single play video cassette 1 in a playing mode. The rotation of the take up reel 3 in the tape winding (playing) direction is transmitted to the activator finger 7 by the frictional contact of the frictional surface 8 and the take up reel flange 4 causing it to rotate about the pivot pin 9 driving the mechanically linked pawl 6 away from the toothed periphery 5 of the take up reel flange 4. This allows the take up reel 3 to rotate freely in the tape playing direction. The supply reel 11 is also free to rotate because the control mechanism 19 is positioned by the action of a spring 20 in a notch 18 in the pivot 17 portion of the supply reel activator finger 15 and pawl 14. The pawl 14-finger 15 arrangement for the supply reel 11 is similar to that previously described with reference to the take up reel 3. The action of spring 20 prevents engagement of the actuator finger 15 and pawl 14 with the supply reel 11. Thus, the actuator finger 15 is prevented from driving the pawl 14 into contact with the toothed peripheral portion 13 of the supply reel flange 12.

The control mechanism 19 comprises a upper portion 31 slidably mounted along the interior of the cassette housing 30 and having a downwardly extending sloped portion 21 positioned opposite an aperture 22 in the cassette housing 30. The sloped portion 32 terminates in a peaked portion 33 joined to a surface 34 which extends directly back to the upper portion of the control mechanism 19. The surface portion 34 extending back to the control mechanism is engaged by a spring 20 to maintain it in position.

Figure 5:
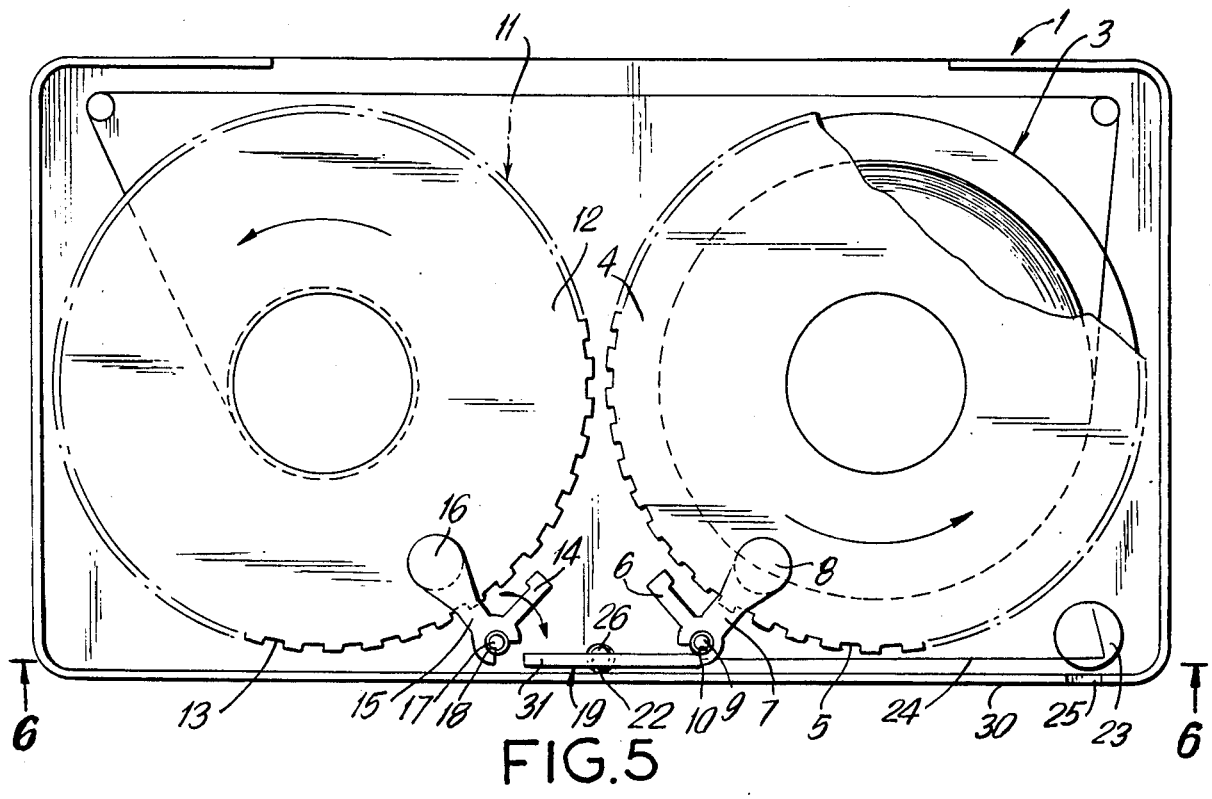
FIG. 5 is a top view of the invention in a rewinding mode.
Figure 6:
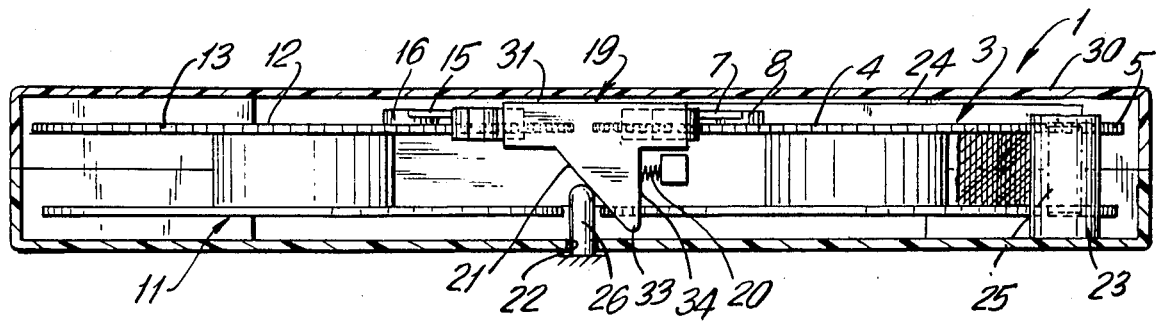
FIG. 6 is a cross-sectional view of the invention taken along the line 6—6 of FIG. 5.

FIG. 5 discloses the authorized rewinding mode for the tape cassette. The spring loaded control mechanism 19 which is normally mounted with the angled surface 21 positioned opposite the aperture 22 in the cassette housing 30 is moved out of position. A rewinding tool 26 is introduced into the aperture 22 to exert pressure on the sloping surface 21 to overcome the force of the spring 20 and cause the control mechanism 19 to move into a notch 10 in the pivot portion of the take up reel actuator finger 7. The pawl portion 6 and actuator finger 7 are thus prevented from moving into engagement with the toothed portion 5 of the take up reel flange 4. This permits the take up reel 3 to rotate in the tape rewinding direction so that the cassette 1 can be rewound.

Figure 7:
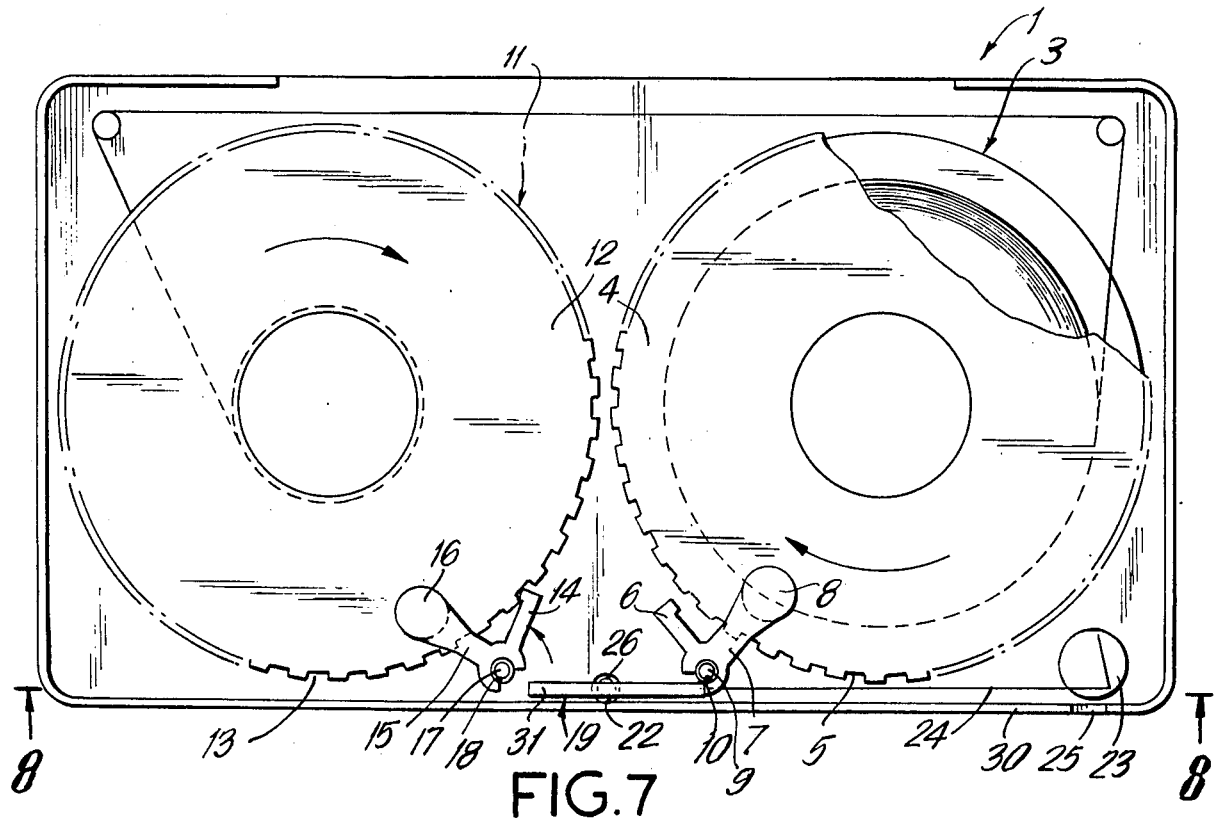
FIG. 7 is a top view of the invention with the supply wheel pawl in place, to prevent playing with a tool inserted in the cassette aperture; and, FIG. 8 is a cross-sectional view of the invention taken along the line 8—8 of FIG. 7.
Figure 8:
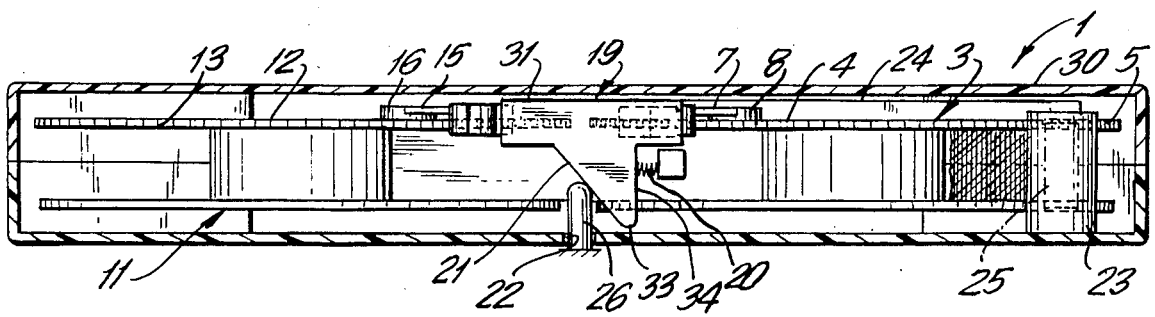

FIG. 7 discloses a mode wherein the tape cassette 1 prevents playing with a tool 26 inserted into the aperture 22 to permit rewinding. When the rewinding tool 26 is inserted into the aperture 22 of the cassette housing, a pawl 14 which is mounted inside the cassette housing 30 on a pivot pin 18 is activated by a mechanically integral finger 15 with a frictional surface 16. The frictional surface 16 is held in contact with the supply reel 12 by either gravity or elasticity of the material. The pawl 14 and activator finger 15 are located in the cassette housing 1 so that when the supply reel 11 is rotated in a tape playing direction, the frictional contact between the activator finger's frictional surface 16 and the supply reel flange 12 transmit the movement of the supply reel to the activator finger 15.

This action rotates the finger 15 about its pivot 17 driving the mechanically connected pawl 14 into the toothed peripheral portion 13 of the supply reel flange 12. This stops the rotation in the tape playing direction.

The activator finger 15 and pawl 14 are free to rotate about pivot 17 when a rewinding tool 26 is inserted into the aperture 22 of the cassette housing 1 as in FIG. 3 in the authorized rewinding mode. The control mechanism 19 is driven to interfere with the operation of the activator finger 7 and ratchet 6 on the take up reel 3. The control mechanism 19 moves out of contact with the notch 18 in the pivot portion 17 of the activator finger 15 and pawl 14 of the supply reel 11.

A counter 23 is provided to obtain an auditable permanent record of the number of times the cassette housing 1 and coupled to the control mechanism 19 with a mechanical link 24 so that the number of times a rewinding tool is inserted into the aperture 22 may be counted. The rewinding tool moves the control mechanism 19 as described above and also moves the mechanical link 24 which in turn moves the stroke arm (not shown) of the mechanical counter 23 causing the counter to tally a count. The mechanical counter's readout may be read through a window 25 in the cassette housing.

It is understood that the above-described arrangements are merely illustrative examples of the application. Numerous other arrangements may be readily devised by those skilled in the are which will embody the principles of the invention and fall within the spirit and scope thereof.

I claim:

1. A single play tape cassette driven by a playing apparatus comprising:
   a take up reel and a supply reel having a tape movable therebetween, each of said reels having toothed peripheral portions,
   first mounting means, a first pivotly mounted pawl mechanism mounted thereto having a first pawl arm mounted for engagement with the toothed peripheral portion of the take up reel and a first finger integral with the first pawl and located at an angle thereto and mounted in engagement with the take up reel, and second mounting means, a second pivotally mounted pawl mechanism mounted thereto having a second pawl arm mounted for engagement with the toothed peripheral portion of the supply reel, and a second finger integral with the second pawl and mounted in engagement with the supply reel, wherein the first pawl is actuated by the first finger to prevent rotation of the take up reel in a rewinding direction, and the second pawl is actuated by the second finger to prevent rotation of the supply reel in an unwinding direction,
   control means mounted within the cassette to selectively disable the first or the second pawl mechanisms to allow rotation of the supply reel in the unwinding direction or to allow rotation of the take up reel in the rewinding direction, and
   means to engage the control means to cause it to disable one of the pawl mechanisms.

2. A single play tape cassette in accordance with claim 1 wherein:
   the control means comprises support means, an elongated slidable member mounted on the support means for movement therealong, said slidable member having protruding two end portions which each engage and disable one of the pawl mechanisms at either selected end of the slidable member and a downwardly extending member including a first sloped forward surface and a rear vertical surface and,
   a spring engaging said rear surface to maintain the control mechanism in a neutral position.

3. A single play tape cassette in accordance with claim 2 further including:
   a counter coupled to the control means to record the number of times the control means are moved.

4. A single play tape cassette in accordance with claim 2 wherein
   the supply reel and the take up reel each include flange portions, and,
   the first integral finger and the second integral finger each include a frictional surface which engages the flange portion of the take up reel and supply reel respectively to move the pawl mechanisms upon rotation of the respective reel in a predetermined direction.

5. A single play tape cassette in accordance with claim 2 wherein
   the first and second pawl mechanisms each include a pivot portion having a notch for engagement with the slidable member of the control mechanism, the pawl arm extending outwardly from the pivot position and the integral finger extending outwardly at substantially a right angle to the ratchet arm.

* * * * *